United States Patent
Sakakibara

(10) Patent No.: US 10,355,291 B2
(45) Date of Patent: Jul. 16, 2019

(54) FUEL CELL SYSTEM AND FUEL CELL VEHICLE

(71) Applicant: TOYOTA JIDOSHA KABUSHIKI KAISHA, Toyota-shi, Aichi-ken (JP)

(72) Inventor: Hideaki Sakakibara, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 205 days.

(21) Appl. No.: 15/258,208

(22) Filed: Sep. 7, 2016

(65) Prior Publication Data
US 2017/0069920 A1    Mar. 9, 2017

(30) Foreign Application Priority Data

Sep. 8, 2015 (JP) .................... 2015-176922

(51) Int. Cl.
| | |
|---|---|
| H01M 8/0432 | (2016.01) |
| H01M 8/04007 | (2016.01) |
| H01M 8/04029 | (2016.01) |
| H01M 8/04746 | (2016.01) |

(52) U.S. Cl.
CPC ... *H01M 8/04074* (2013.01); *H01M 8/04029* (2013.01); *H01M 8/04358* (2013.01); *H01M 8/04768* (2013.01); *H01M 2250/20* (2013.01); *Y02T 90/32* (2013.01)

(58) Field of Classification Search
CPC ......... H01M 8/04074; H01M 8/04029; H01M 8/04358; H01M 8/04768
See application file for complete search history.

(56) References Cited

U.S. PATENT DOCUMENTS

| | | | |
|---|---|---|---|
| 2003/0162066 A1* | 8/2003 | Shiraishi | H01M 8/0267 |
| | | | 429/437 |
| 2004/0247959 A1 | 12/2004 | Kimbara et al. | |
| 2009/0208796 A1 | 8/2009 | Matsuo | |

(Continued)

FOREIGN PATENT DOCUMENTS

| | | |
|---|---|---|
| CN | 104428935 A | 3/2015 |
| DE | 20 2015 101 010 U1 | 4/2015 |
| EP | 1 580 830 A2 | 9/2005 |

(Continued)

OTHER PUBLICATIONS

Machine translation of JP 2010267471.*

*Primary Examiner* — Jonathan G Jelsma
(74) *Attorney, Agent, or Firm* — Finnegan, Henderson, Farabow, Garrett & Dunner, LLP

(57) ABSTRACT

The fuel cell system is provided with a radiator, a first flow passage in which refrigerant flows from a fuel cell stack towards a radiator, a second flow passage in which refrigerant flows from the radiator towards a fuel cell stack, a bypass flow passage that connects the radiator with a position in the second flow passage at which refrigerant flows into the fuel cell stack, and a control part. In the bypass flow passage, an on-off valve and a reserve tank are provided from the upstream side. The control part feeds refrigerant to the fuel cell stack by opening the on-off valve and allowing refrigerant previously stored in the reserve tank to join the second flow passage in a case where refrigerant temperature detected by an inflowing refrigerant temperature detection part exceeds previously set base temperature.

5 Claims, 7 Drawing Sheets

(56) References Cited

U.S. PATENT DOCUMENTS

2015/0072259 A1* 3/2015 Furukoshi ......... H01M 8/04029
429/436
2016/0240869 A1* 8/2016 Eschenbach .......... B60L 3/0053

FOREIGN PATENT DOCUMENTS

| JP | 2005-005040 A | 1/2005 | | |
|----|---|---|---|---|
| JP | 2007-311058 | 11/2007 | | |
| JP | 2010-267471 | 11/2010 | | |
| KR | 10-2007-0049212 A | 5/2007 | | |
| WO | WO-2015062827 A2 * | 5/2015 | ............ | B60L 3/0053 |

* cited by examiner

FUEL CELL SYSTEM AND FUEL CELL VEHICLE

INCORPORATION BY REFERENCE

The disclosure of Japanese Patent Application No. 2015-176922 filed on Sep. 8, 2015 including the specification, drawings and abstract is incorporated herein by reference in its entirety.

BACKGROUND

1. Technical Field

The disclosure relates to a fuel cell system and a fuel cell vehicle.

2. Description of Related Art

A fuel cell system is provided with a cooling mechanism that cools a fuel cell so that temperature of the fuel cell does not exceed given temperature while generating power. As such a cooling mechanism, a liquid-cooled cooling mechanism is known, which cools a fuel cell by allowing refrigerant such as cooling water to circulate.

In Japanese Patent Application Publication No. 2010-267471 (JP 2010-267471 A), a fuel cell system is described, which is a liquid-cooled type fuel cell system including a cooling water passage, in which cooling water for cooling the fuel cell circulates, and a water pump that feeds cooling water under pressure, and a radiator that lowers temperature of passing cooling water.

In the fuel cell system described in JP 2010-267471 A, when a high-load operation is carried out temporarily, there are instances where a calorific value of the fuel cell increases and temperature of cooling water becomes high temporarily. As a measure against a temporary high temperature of cooling water, enhancement of performance of a radiator is considered to ensure heat dissipation performance of cooling water. However, when such a measure is taken, there is a problem that a size of a radiator becomes large.

SUMMARY

The disclosure provides a fuel cell system that is able to restrain temperature of cooling water from becoming temporarily high without increasing a size of a radiator.

The first aspect of the disclosure relates to a fuel cell system, which includes a fuel cell, a radiator that lowers temperature of refrigerant for cooling the fuel cell, a first flow passage in which refrigerant flows from the fuel cell towards the radiator, a second flow passage in which refrigerant flows from the radiator towards the fuel cell, an inflowing refrigerant temperature detection part that is structured so as to detect temperature of refrigerant flowing in the second flow passage into the fuel cell, a first bypass flow passage that connects a position on a downstream side of the radiator with a position in the second flow passage on an upstream side of the inflowing refrigerant temperature detection part, an on-off valve that switches between opening and closing of the first bypass flow passage, a reserve tank that is provided in the first bypass flow passage and stores refrigerant, and a control part that is structured so as to control an operation of the on-off valve based on refrigerant temperature detected by the inflowing refrigerant temperature detection part. The control part is structured so that, in a case where refrigerant temperature detected by the inflowing refrigerant temperature detection part exceeds previously set first base temperature, the control part feeds refrigerant to the fuel cell by opening the on-off valve and allowing refrigerant previously stored in the reserve tank to join refrigerant that is fed from the radiator and flows in the second flow passage. Thus, it is possible to restrain cooling water from becoming high temperature temporarily without increasing the size of the radiator.

Further, the fuel cell system may further include an outflowing refrigerant temperature detection part that is structured so as to detect refrigerant temperature in the first flow passage immediately after flowing out from the fuel cell, a second bypass flow passage that connects a position in the first flow passage on an upstream side of the radiator, the reserve tank, and the second flow passage with each other, and a three-way valve that is provided in a connecting part between the first flow passage and the second bypass flow passage, and adjusts an amount of refrigerant flowing into the radiator from the first flow passage and an amount of refrigerant flowing into the second bypass flow passage from the first flow passage. The control part may be structured so that, in a case where refrigerant temperature detected by the outflowing refrigerant temperature detection part is previously set second base temperature or lower, the control part adjusts opening of the three-way valve so that entire refrigerant flows into the second bypass flow passage from the first flow passage. Thus, it is possible to store low-temperature refrigerant in the reserve tank.

Further, the control part may also be structured so that, in a case where refrigerant temperature detected by the outflowing refrigerant temperature detection part exceeds the previously set second base temperature, the control part adjusts opening of the three-way valve so that entire refrigerant flows into the radiator from the first flow passage, and closes the on-off valve. Thus, it is possible to maintain refrigerant stored in the reserve tank at low temperature.

The second aspect of the disclosure relates to a fuel cell vehicle provided with the fuel cell system according to the first aspect.

The third aspect of the disclosure relates to a fuel cell vehicle that includes a fuel cell, a radiator that lowers temperature of refrigerant for cooling the fuel cell, a first flow passage in which refrigerant flows from the fuel cell towards the radiator, a second flow passage in which refrigerant flows from the radiator towards the fuel cell, a navigation system, a bypass flow passage that connects a position on a downstream side of the radiator with the second flow passage, an on-off valve that switches between opening and closing of the bypass flow passage, a reserve tank that is provided in the bypass flow passage and stores refrigerant, a pump that allows the refrigerant to circulate through the radiator, first flow passage, the second flow passage, and the fuel cell, and a control part that is structured so as to estimate refrigerant temperature in the downstream of the bypass flow passage based on road information from the navigation system, valve-opening time of the on-off valve, and operating time of the pump, and, in a case where the estimated refrigerant temperature exceeds previously set base temperature, the control part feeds refrigerant to the fuel cell by opening the on-off valve and allowing refrigerant previously stored in the reserve tank to join refrigerant that is fed from the radiator and flows in the second flow passage.

According to the disclosure, it is possible to restrain temperature of cooling water from being temporarily high without increasing the size of the radiator.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
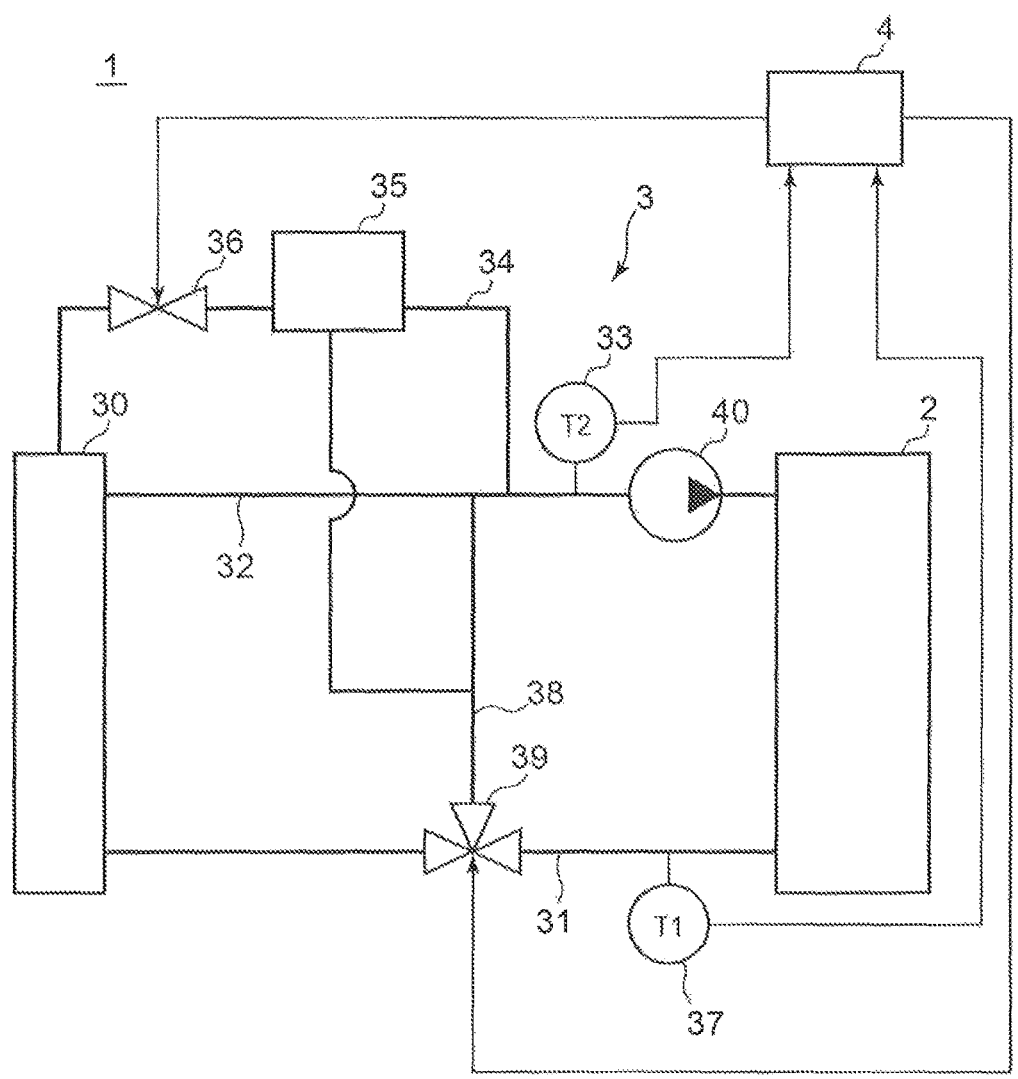
FIG. 1 is a view showing a block diagram of a fuel cell system according to an embodiment.

Embodiments of the disclosure are explained below with reference to the drawings. FIG. 1 is a view showing a block diagram of a fuel cell system according to the embodiment. A fuel cell system 1 includes a fuel cell stack 2 as a fuel cell, a cooling mechanism 3 for cooling the fuel cell stack 2, and a control part 4.

The fuel cell stack 2 is structured by, for example, laminating a plurality of cells of the fuel cell, each of which is formed by sandwiching an electrolyte membrane such as a solid polymer ion exchange membrane with an anode electrode (fuel electrode) and a cathode electrode (oxidant electrode) from both sides. Once the cell of the fuel cell feeds anode gas containing hydrogen to the anode electrode, and air containing oxygen to the cathode electrode, hydrogen ion generated in the anode electrode due to a catalytic reaction moves to the cathode electrode through the electrolyte membrane. Then, the hydrogen ion and oxygen cause a chemical reaction in the cathode electrode, thereby generating power. When hydrogen ion and oxygen cause a chemical reaction in the cathode electrode, water is generated. As the fuel cell stack 2 is structured by laminating several hundreds of cells of the fuel cell, it is possible to obtain high power required for driving a vehicle such as an automobile.

The cooling mechanism 3 is provided with a radiator 30, a first flow passage 31, a second flow passage 32, an inflowing refrigerant temperature detection part 33, a bypass flow passage 34, a reserve tank 35, and an on-off valve 36. The radiator 30 lowers temperature of refrigerant such as cooling water that cools the fuel cell stack 2. The first flow passage 31 is a flow passage in which the refrigerant flows from the fuel cell stack 2 towards the radiator 30. The second flow passage 32 is a flow passage in which the refrigerant flows form the radiator 30 towards the fuel cell stack 2. The inflowing refrigerant temperature detection part 33 is a temperature sensor and detects a refrigerant temperature in the second flow passage 32 immediately before the refrigerant flows into the fuel cell stack 2. The bypass flow passage 34 connects the radiator 30 (a refrigerant outlet of the radiator 30) with a position of the second flow passage 32 on an upstream side of the inflowing refrigerant temperature detection part 33. The bypass flow passage 34 is provided with the reserve tank 35 storing the refrigerant, and the on-off valve 36. The reserve tank 35 is provided in the bypass flow passage 34 at a position on a downstream side of the on-off valve 36. The on-off valve 36 switches opening and closing of the bypass flow passage 34.

The cooling mechanism 3 further includes an outflowing refrigerant temperature detection part 37, a second bypass flow passage 38, a three-way valve 39, and a water pump 40. The outflowing refrigerant temperature detection part 37 detects refrigerant temperature in the first flow passage 31 immediately after the refrigerant flows out from the fuel cell stack 2. The second bypass flow passage 38 connects a position in the first flow passage 31 on the upstream side of the radiator 30, the reserve tank 35, and the second flow passage 32 with each other. The three-way valve 39 is provided in a connecting part between the first flow passage 31 and the second bypass flow passage 38, and adjusts an amount of the refrigerant flowing into the radiator 30 from the first flow passage 31 and an amount of the refrigerant flowing into the second bypass flow passage 38 from the first flow passage 31. The three-way valve 39 may be operated by an on/off operation or the opening of the three-way valve 39 may be changed gradually (linearly).

The water pump 40 is provided in the second flow passage 32 near an inlet of the fuel cell stack 2, and circulates the refrigerant in the cooling mechanism 3. A delivery flow rate is continuously changed by rotation speed of the water pump 40.

A control part 4 is structured by a microcomputer provided with a central processing unit (CPU), a read only memory (ROM), a random access memory (RAM), an input-output interface (I/O interface) and so on. The control part 4 controls opening and closing of the on-off valve 36 based on refrigerant temperature detected by the outflowing refrigerant temperature detection part 37. The control part 4 also adjusts opening of the three-way valve 39.

Next, explained below is processing for controlling a refrigerant feeding operation from the reserve tank 35 based on refrigerant temperature detected by the inflowing refrigerant temperature detection part 33. In order to cool the fuel cell stack 2 sufficiently, it is necessary to maintain refrigerant temperature immediately before flowing into the fuel cell stack 2 at given temperature or lower. When refrigerant temperature immediately before flowing into the fuel cell stack 2 becomes output limiting temperature (about 85° C.) or higher, an output of the fuel cell stack 2 is restricted in order to prevent an excessive temperature increase of the fuel cell stack 2.

In the embodiment, in a case where refrigerant temperature immediately before flowing into the fuel cell stack 2 (refrigerant temperature detected by the inflowing refrigerant temperature detection part 33) exceeds previously-determined base temperature TB, the control part 4 opens the on-off valve 36 so that the refrigerant stored in the reserve tank 35 in advance is allowed to join the refrigerant fed from the radiator 30 and flowing in the second flow passage 32, and is fed to the fuel cell stack 2. The base temperature TB is set at a value lower than the output limiting temperature. Temperature of the refrigerant inside the reserve tank 35 is, for example, −35~57° C. Because of this, it becomes possible to maintain refrigerant temperature immediately before flowing into the fuel cell stack 2 so as not to become the output limiting temperature or higher.

Figure 2:
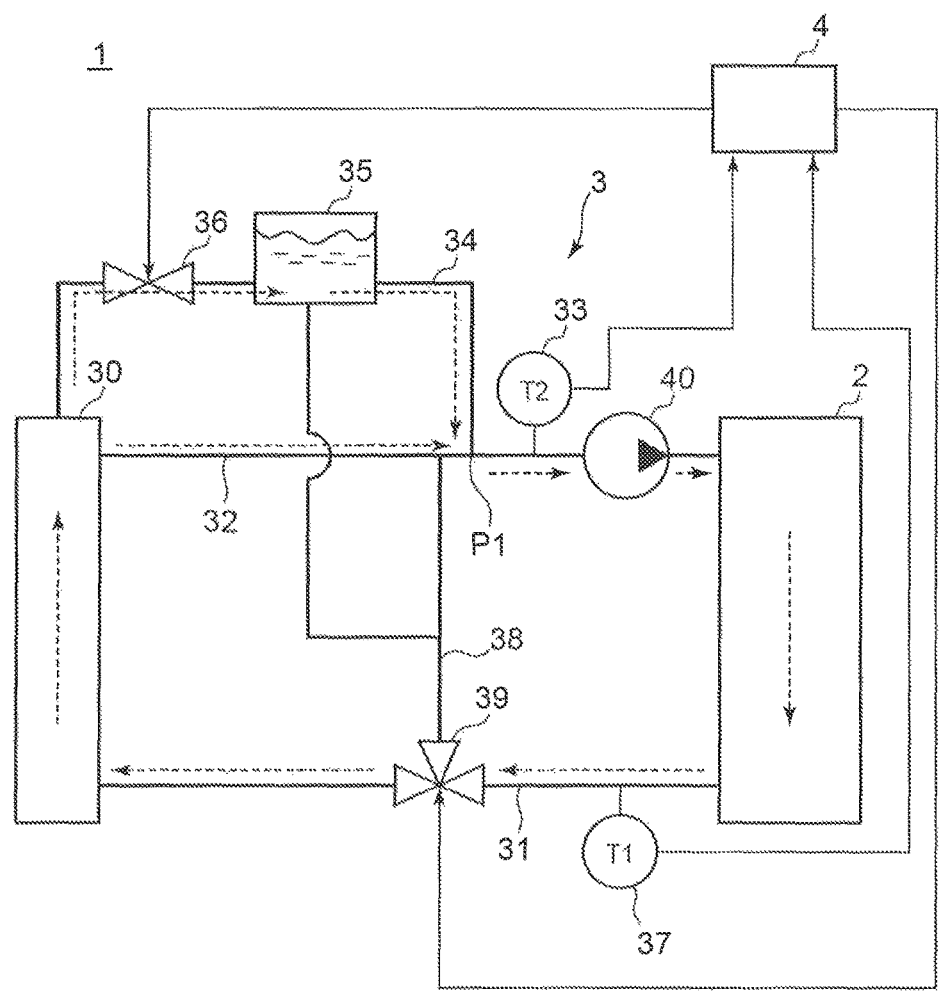
FIG. 2 is a view showing a state where an on-off valve is open in the fuel cell system according to the embodiment.

FIG. 2 is a view showing a state where the on-off valve 36 is open. The opening of the three-way valve 39 is adjusted so that the entire refrigerant flows into the radiator 30 from the first flow passage 31. As shown in FIG. 2, when the on-off valve 36 is open, the low-temperature refrigerant stored in the reserve tank 35 in advance and the refrigerant after heat is dissipated through the radiator 30 are joined together at a connecting part P1 between the bypass flow passage 34 and the second flow passage 32. Thus, it is possible to restrain cooling water temperature from becoming temporarily high without increasing the size of the radiator.

A fuel cell system described in Japanese Patent Application Publication No. 2007-311058 (JP 2007-311058 A) is provided with two flow passages (a closed circuit) that can be switched between a flow passage in which cooling water flows through an insulated tank where low-temperature cooling water is stored, and a flow passage in which cooling water flows without going through the insulated tank (a normal flow passage in which cooling water flows through a radiator). When temperature of fuel cell is given temperature or higher, a flow passage is switched from the normal flow passage in which cooling water flows through the radiator to the flow passage in which cooling water flows through the insulated tank. However, in the fuel cell system described in JP 2007-311058 A, cooling water is allowed to circulate only in either one of the flow passage in which cooling water flows through the insulated tank and the normal flow passage in which cooling water flows through the radiator.

On the contrary, in the embodiment of the disclosure, by allowing low-temperature refrigerant stored in the reserve tank 35 in advance to join the refrigerant after heat is dissipated through the radiator 30, it is possible to swiftly keep the refrigerant temperature immediately before flowing into the fuel cell stack 2 at the output limiting temperature or lower. Thus, it is possible to cool the fuel cell more sufficiently when an operating load of the fuel cell system temporarily increases sharply.

Control for feeding refrigerant stored in the reserve tank 35 in advance to the refrigerant flowing in the second flow passage 32 could be carried out based on temperature of cooling water immediately after flowing out from the fuel cell stack 2 or temperature directly measured inside the fuel cell stack 2. However, when the control is carried out based on refrigerant temperature immediately before flowing into the fuel cell stack 2 (refrigerant temperature detected by the inflowing refrigerant temperature detection part 33), the control is carried out more responsively. Therefore, it is possible to respond to a sudden increase of an operating load of the fuel cell system 1 swiftly.

In the fuel cell system 1, time in which a temporary increase of an operating load can be dealt with depends on the capacity of the reserve tank 35. For example, in Highway 73 in the United States of America with especially large number of ups and downs, when trying to drive on a route with the maximum gradient of 6.3% at vehicle speed of 75 miles/hour, it takes about 65 seconds until the route is passed. While a vehicle is passing a route having such a steeps slope, it is considered that a high load operation continues in the fuel cell system 1. Therefore, in designing the fuel cell system 1, the capacity of the reserve tank 35 may be decided depending on the length of time in which a high load operation is assumed to continue.

Figure 3:
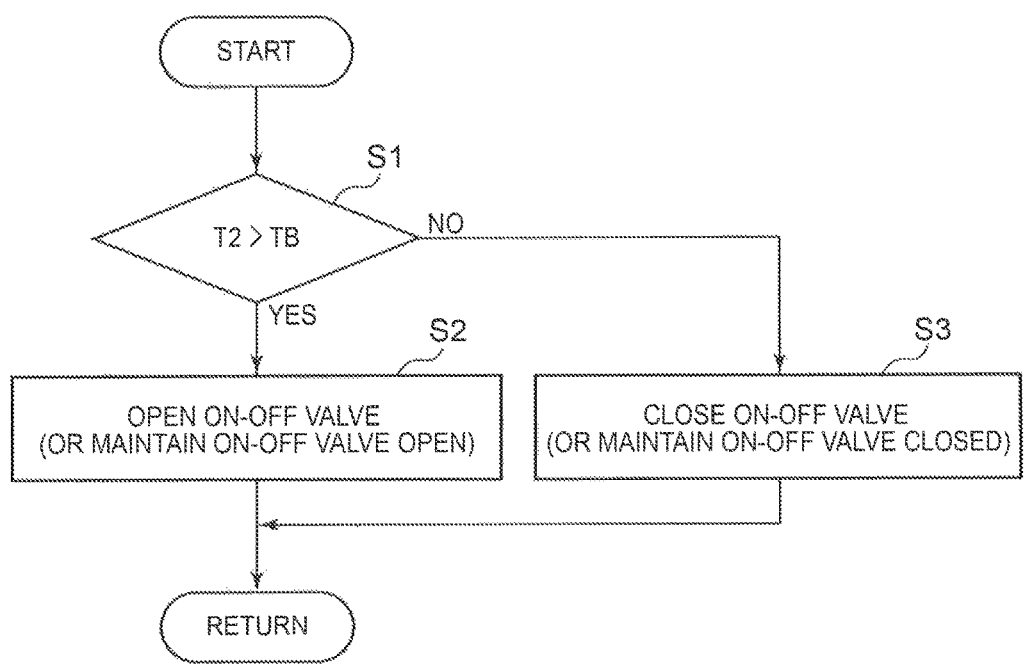
FIG. 3 is a flowchart showing a flow of processing for controlling a refrigerant feeding operation from a reserve tank 35 in the fuel cell system according to the embodiment based on refrigerant temperature detected by an inflowing refrigerant temperature detection part.

FIG. 3 is a flowchart showing a flow of processing for switching between opening and closing of the on-off valve 36 based on refrigerant temperature detected by the inflowing refrigerant temperature detection part 33. In the explanation below, FIG. 1 is also referred to as appropriate. As shown in FIG. 3, first of all, it is determined whether or not refrigerant temperature (T2) detected by the inflowing refrigerant temperature detection part 33 exceeds the previously set base temperature TB (step S1). In step S1, in a case where it is determined that the refrigerant temperature (T2) detected by the inflowing refrigerant temperature detection part 33 exceeds the previously set base temperature TB (T2>TB) (YES in step S1), the on-off valve 36 is opened, or maintained opened (step S2). In step S1, in a case where the refrigerant temperature (T2) detected by the inflowing refrigerant temperature detection part 33 does not exceed the previously set base temperature TB (T2≤TB) (in the case of NO in step S1), the on-off valve 36 is closed, or maintained closed (step S3). While operating the fuel cell system 1, the processing of steps S1~S3 is repeated.

As stated above, by switching between opening and closing of the on-off valve 36, it is possible to prevent temperature of refrigerant circulating the cooling mechanism from exceeding the limiting temperature due to a temporary increase in an operating load.

Figure 4:
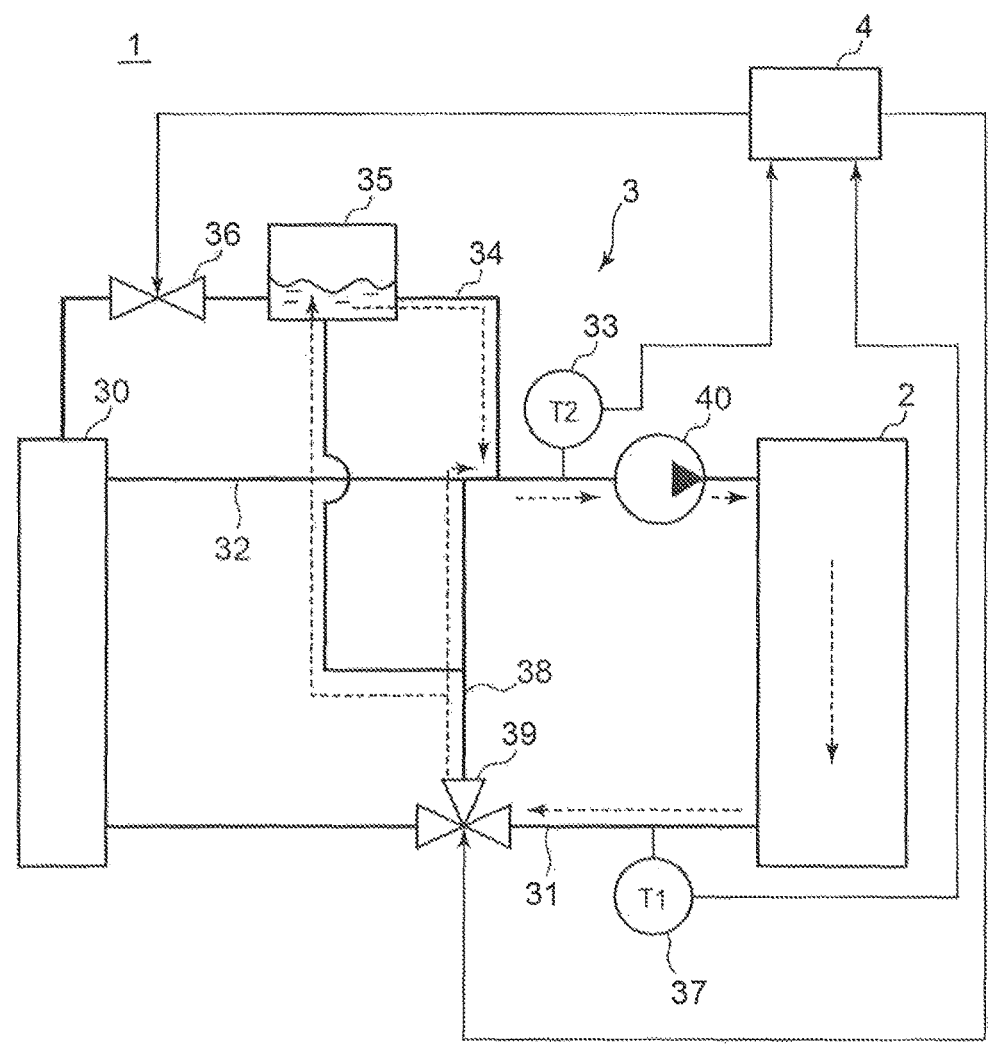
FIG. 4 is a view explaining an example of a method for storing low-temperature refrigerant in the reserve tank in the fuel cell system according to the embodiment.
Figure 5:
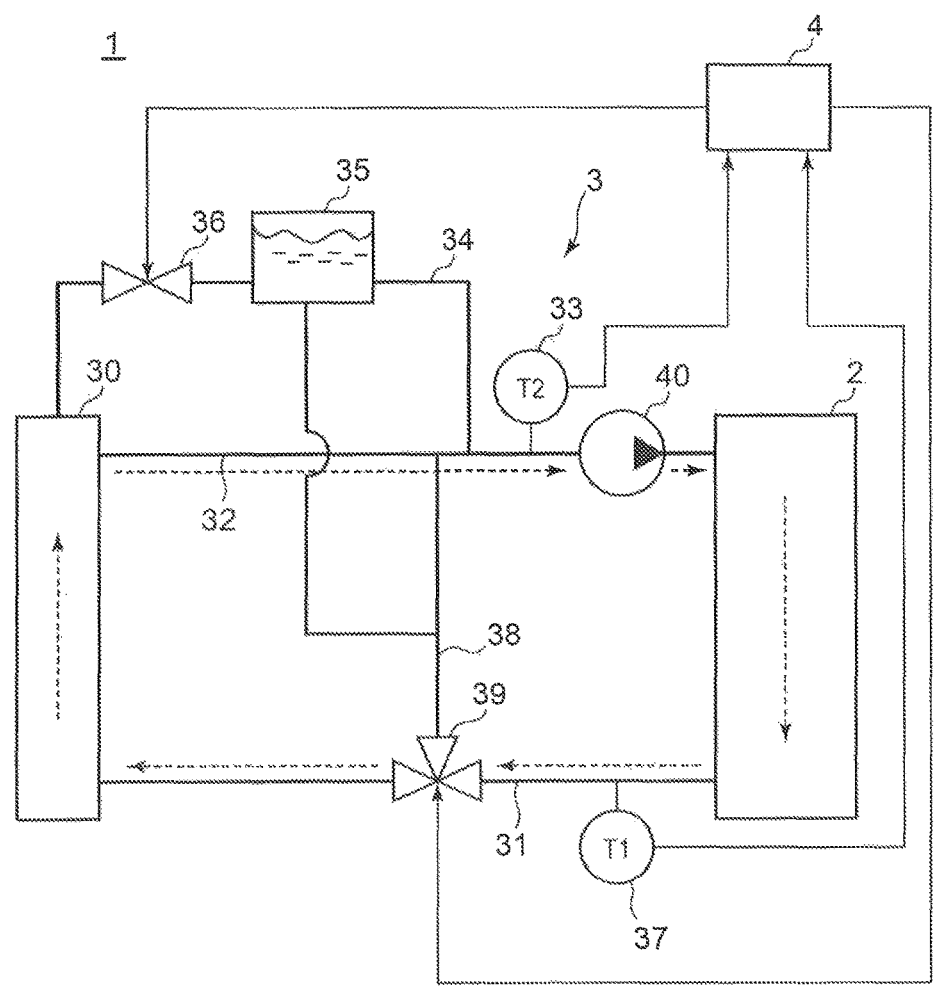
FIG. 5 is a view explaining an example of a method for storing low-temperature refrigerant in the reserve tank in the fuel cell system according to the embodiment.

Next, a method for storing low-temperature refrigerant in the reserve tank 35 is explained below. FIG. 4 and FIG. 5 are views explaining examples of methods for storing low-temperature refrigerant in the reserve tank 35. In the case where refrigerant temperature (T1) detected by the outflowing refrigerant temperature detection part 37 is previously set second base temperature TB2 (target temperature for operation: about 57° C.) or lower (T1≤TB2), the control part 4 adjusts the opening of the three-way valve 39 so that the entire refrigerant flows into the second bypass flow passage 38 from the first flow passage 31, and also opens the on-off valve 36, as shown in FIG. 4. As stated above, the second bypass flow passage 38 connects the position of the first flow passage 31 on the upstream side of the radiator 30, the reserve tank 35, and the second flow passage 32 with each other. This means that, when refrigerant temperature (T1) detected by the outflowing refrigerant temperature detection part 37 is the second base temperature TB2 or lower (T1≤TB2), it is determined that temperature of refrigerant circulating in the cooling mechanism 3 is low, and refrigerant is not allowed to flow into the radiator 30 from the first flow passage 31. The refrigerant is allowed to flow into the reserve tank 35 and the second flow passage 32 from the first flow passage 31, and the low-temperature refrigerant is stored in the reserve tank 35. Inside the reserve tank 35, low-temperature refrigerant at about −30~57° C. is stored. The second bypass flow passage 38 may connect a position in the first flow passage 31 on the upstream side of the radiator 30 with the reserve tank 35. In such a case, the entire refrigerant flows into the reserve tank 35 from the first flow passage 31 through the second bypass flow passage 38.

Meanwhile, as shown in FIG. 5, in the case where the refrigerant temperature (T1) detected by the outflowing refrigerant temperature detection part 37 exceeds the previously set second base temperature TB2 (T1>TB2), the control part 4 adjusts the opening of the three-way valve 39 so that the entire refrigerant flows into the radiator 30 from the first flow passage 31, and also closes the on-off valve 36. This means that, in the case where the refrigerant temperature (T1) detected by the outflowing refrigerant temperature detection part 37 exceeds the second base temperature TB2 (T1>TB2), it is determined that temperature of refrigerant circulating in the cooling mechanism 3 is relatively high, and the refrigerant at relatively high temperature is not allowed to flow into the reserve tank 35. In this way, it is possible to maintain refrigerant stored inside the reserve tank 35 at low temperature.

Figure 6:
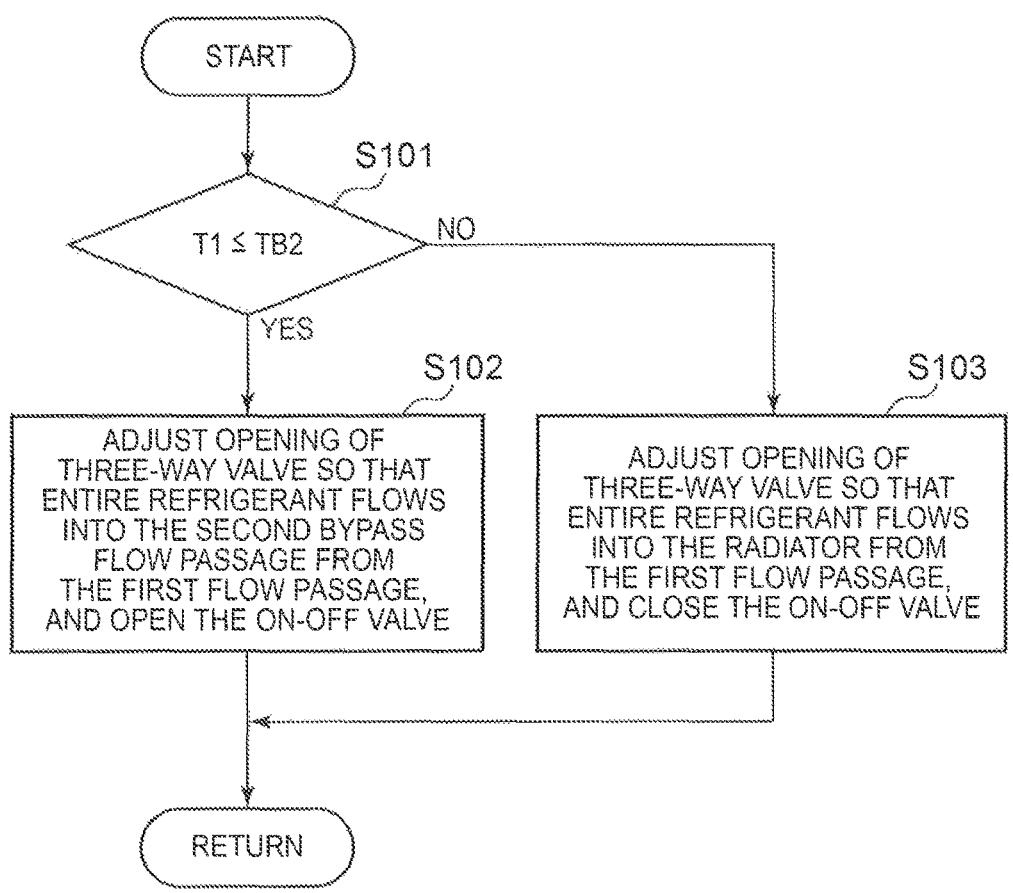
FIG. 6 is a flowchart showing a flow of processing for storing low-temperature refrigerant in the reserve tank in the fuel cell system according to the embodiment.

FIG. 6 is a flowchart showing a flow of processing for storing low-temperature refrigerant in the reserve tank 35. In the explanation below, FIG. 1 is also referred to as appropriate. As shown in FIG. 6, first of all, it is determined whether or not refrigerant temperature (T1) detected by the outflowing refrigerant temperature detection part 37 is the previously set second base temperature (target temperature for operation) TB2 or lower (step S101). In step S101, in a case where the refrigerant temperature (T1) detected by the outflowing refrigerant temperature detection part 37 is the previously set second base temperature TB2 or lower (T1≤TB2) (in the case of YES in step S101), the opening of the three-way valve 39 is adjusted so that the entire refrigerant flows into the second bypass flow passage 38 from the first flow passage 31, and the on-off valve 36 is opened (step S102).

In step S101, when the refrigerant temperature (T1) detected by the outflowing refrigerant temperature detection part 37 exceeds the previously set second base temperature TB2 (T1>TB2) (in the case of NO in step S101), the opening of the three-way valve 39 is adjusted so that the entire refrigerant flows into the radiator 30 from the first flow passage 31, and the on-off valve 36 is closed (step S103). While operating the fuel cell system 1, the processing of steps S101~S103 is repeated.

In the processing flow in FIG. 3, in the case where the refrigerant temperature (T2) detected by the inflowing refrigerant temperature detection part 33 does not exceed the previously set base temperature TB in step S1, the on-off valve 36 is closed in step S3. On the contrary, in the case where processing for storing low-temperature refrigerant in the reserve tank 35 is carried out in accordance with the flow explained by using FIG. 6, the processing of step S102 in FIG. 6 is prioritized over the processing of step S3 in FIG. 3. This means that in the case where it is determined that the refrigerant temperature (T2) detected by the inflowing refrigerant temperature detection part 33 does not exceed the previously set base temperature TB, and it is determined that the refrigerant temperature (T1) detected by the outflowing refrigerant temperature detection part 37 is the previously set second base temperature TB2 or lower, the opening of the three-way valve 39 is adjusted so that the entire refrigerant flows into the second bypass flow passage 38 from the first flow passage 31, and also the on-off valve 36 is opened.

By adjusting the opening of the three-way valve and opening and closing of the on-off valve 36 as described above, it is possible to store low-temperature refrigerant in the reserve tank 35.

The invention is not limited to the foregoing embodiment, and changes may be made as appropriate without departing from the gist of the invention.

For example, the method for storing low-temperature refrigerant in the reserve tank is not limited to the methods explained in the embodiment.

Figure 7:
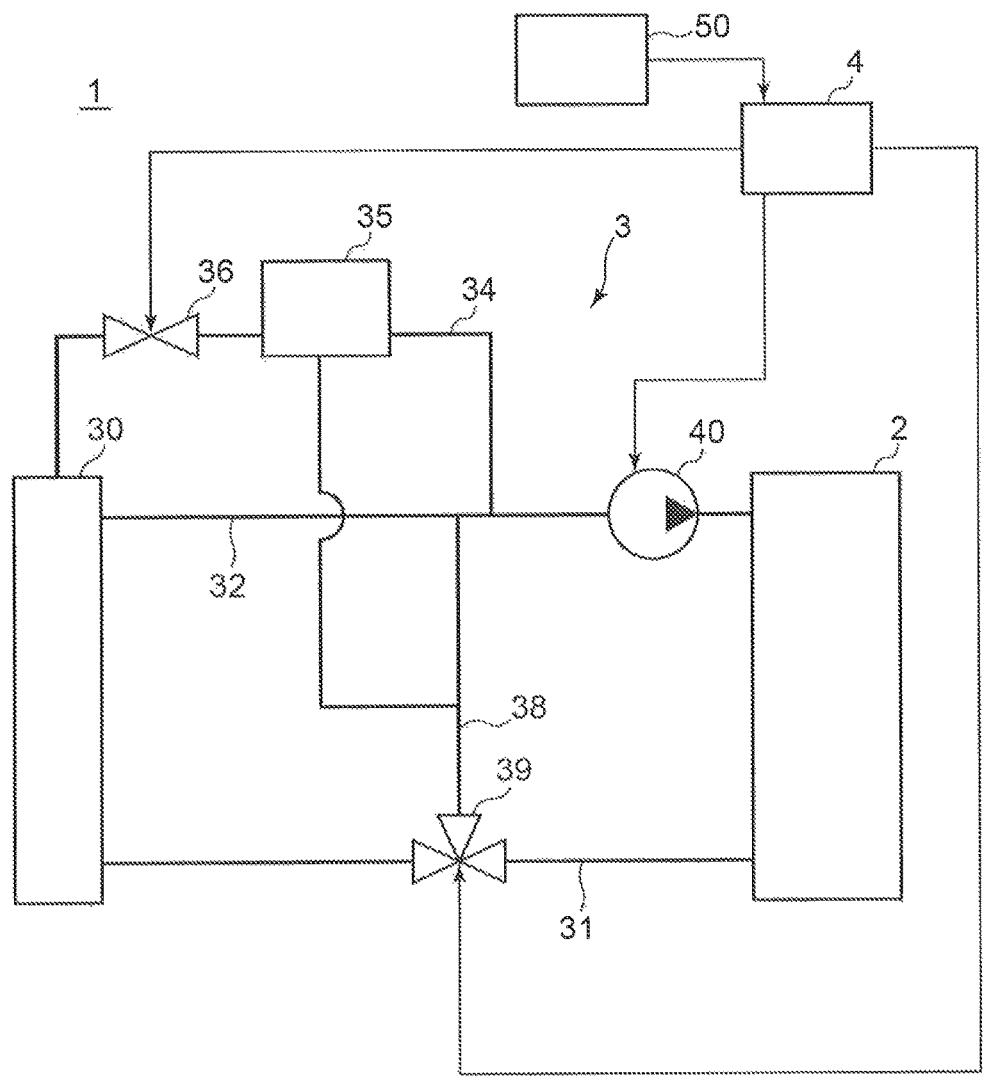
FIG. 7 is an embodiment of a fuel cell system in which a navigation system is used.

The on-off valve 36 may be opened and closed based on position information from a navigation system installed in a vehicle. Like a fuel cell system shown in FIG. 7, information of a road that a vehicle will pass (for example, steep slope and so on) is acquired by a navigation system 50, and the on-off valve 36 may be opened or closed based on a high load operation estimated from the information. In such a case, refrigerant temperature on the downstream side of the bypass flow passage 34 is estimated based on information of a road from the navigation system, valve-opening time of the on-off valve 36, and operating time of the pump 40, and refrigerant temperature on the downstream of the bypass flow passage 34 is estimated. When the estimated refrigerant temperature exceeds previously set base temperature, the on-off valve 36 is opened.

What is claimed is:

1. A fuel cell system comprising:
a fuel cell;
a radiator that lowers temperature of refrigerant for cooling the fuel cell;
a first flow passage in which refrigerant flows from the fuel cell towards the radiator;
a second flow passage in which refrigerant flows from the radiator towards the fuel cell;
an inflowing refrigerant temperature detection part that is structured so as to detect temperature of refrigerant flowing in the second flow passage into the fuel cell;
a first bypass flow passage that connects a position on a downstream side of the radiator with a position in the second flow passage on an upstream side of the inflowing refrigerant temperature detection part;
an on-off valve that switches between opening and closing of the first bypass flow passage;
a reserve tank that is provided in the first bypass flow passage and stores refrigerant; and
a control part programmed to, in a case where refrigerant temperature detected by the inflowing refrigerant temperature detection part exceeds previously set first base temperature, feed refrigerant to the fuel cell by opening the on-off valve while refrigerant is allowed to flow from the radiator such that refrigerant previously stored in the reserve tank is allowed to join refrigerant that is fed from the radiator and flows in the second flow passage.

2. The fuel cell system according to claim 1, further comprising:
an outflowing refrigerant temperature detection part that is structured so as to detect refrigerant temperature in the first flow passage immediately after flowing out from the fuel cell;
a second bypass flow passage that connects a position in the first flow passage on an upstream side of the radiator, the reserve tank, and the second flow passage with each other; and
a three-way valve that is provided in a connecting part between the first flow passage and the second bypass flow passage, and adjusts an amount of refrigerant flowing into the radiator from the first flow passage and an amount of refrigerant flowing into the second bypass flow passage from the first flow passage,
wherein the control part is programmed to, in a case where refrigerant temperature detected by the outflowing refrigerant temperature detection part is previously set second base temperature or lower, adjust opening of the three-way valve so that entire refrigerant flows into the second bypass flow passage from the first flow passage.

3. The fuel cell system according to claim 2, wherein,
in a case where refrigerant temperature detected by the outflowing refrigerant temperature detection part exceeds the previously set second base temperature, the control part is programmed to adjust opening of the three-way valve so that entire refrigerant flows into the radiator from the first flow passage, and close the on-off valve.

4. A fuel cell vehicle comprising:
the fuel cell system according to claim 1.

5. A fuel cell vehicle, comprising:
a fuel cell;

a radiator that lowers temperature of refrigerant for cooling the fuel cell;
a first flow passage in which refrigerant flows from the fuel cell towards the radiator;
a second flow passage in which refrigerant flows from the radiator towards the fuel cell;
a navigation system;
a bypass flow passage that connects a position on a downstream side of the radiator with the second flow passage;
an on-off valve that switches between opening and closing of the bypass flow passage;
a reserve tank that is provided in the bypass flow passage and stores refrigerant;
a pump that allows the refrigerant to circulate through the radiator, the first flow passage, the second flow passage, and the fuel cell; and
a control part programmed to estimate refrigerant temperature in the downstream of the bypass flow passage based on road information from the navigation system, valve-opening time of the on-off valve, and operating time of the pump, and, in a case where the estimated refrigerant temperature exceeds previously set base temperature, feed refrigerant to the fuel cell by opening the on-off valve while refrigerant is allowed to flow from the radiator such that refrigerant previously stored in the reserve tank is allowed to join refrigerant that is fed from the radiator and flows in the second flow passage.

* * * * *